July 21, 1953

H. P. STABLER 2,646,563

V BEAM HEIGHT INDICATOR

Filed Sept. 24, 1946

INVENTOR
HOWARD P. STABLER

BY

ATTORNEY

July 21, 1953

H. P. STABLER 2,646,563

V BEAM HEIGHT INDICATOR

Filed Sept. 24, 1946

INVENTOR
HOWARD P. STABLER

BY

ATTORNEY

Patented July 21, 1953

2,646,563

UNITED STATES PATENT OFFICE 2,646,563

V-BEAM HEIGHT INDICATOR

Howard P. Stabler, Williamstown, Pa., assignor, by mesne assignments, to the United States of America as represented by the Secretary of the Navy Application September 24, 1946, Serial No. 699,044

12 Claims. (Cl. 343—11)

This invention relates to radar indicator systems and more particularly to radar indicator systems for determining the height of a radar target.

In the conventional combined plan and height determining systems, two or more radar systems are often combined to allow continuous and rapid indication of both plan position and height of all targets in field of view. In such a combination, a conventional plan position indicator radar search set locates the azimuth and range of a desired target. An auxiliary indicator is provided which displays an expanded range and azimuth angle presentation. The particular sector of the plan position indicator to be displayed on the auxiliary indicator can be chosen to bring the desired target echo pulses into display for height determination. The simplest form of such as auxiliary indicator displays range along the horizontal axis and azimuth angle on the vertical axis and a calibrated overlay can be superimposed on the indicator screen to provide certain reference markings. The present invention relates to an improved auxiliary indicator having electronic markings in place of the prior art overlay.

A primary object of this invention is to provide an indicator system for a V-beam radar system.

Another object of this invention is to provide an indicator system having two adjustable electronic markers for determination of the size of a persistent pattern on a cathode ray tube presentation.

These and other objects of the present invention will be apparent from the following specification when taken with the accompanying drawings in which:

Fig. 3 is a schematic view of the V-beam principle of height determination. For clarity vertical and slant beams are shown without the ten-degree separation in azimuth which is used in practice; and Fig. 4 illustrates the type of data presentation obtained on the screen of the auxiliary cathode ray indicator.

In the use of the V-beam radar systems for the determination of the height of a target, as illustrated in Fig. 3, the V consists of two fan beams of electromagnetic energy having a common origin. The first beam is about 1 degree in azimuth thickness and is fan-shaped with its plane vertical. The second beam is about 0.7 of a degree in thickness and is also fan-shaped with its plane at 45° to the vertical, the extent of the second or slant fan beam being such as to reach to the same height as the vertical beam. The directional antennas radiating the beam patterns are so arranged that they rotate together about a vertical axis. The direction of rotation is such that the vertical beam leads the slant beam.

The height of a target is determined by measuring the azimuth angle through which the antennas turn between the positions at which the target is aligned, first in the vertical beam and later in the slant beam. It may be shown from the geometry of Fig. 3 that, if this angle is denoted by $\Delta\phi$, then $$h = \frac{R \sin \Delta\phi}{(1+\sin^2 \Delta\phi)^{\frac{1}{2}}}$$

where $h$ is the height of the radar target and $R$ is the range of the radar target. At low elevations there is danger that the two target echo signals may be displayed so close together that no height can be found. This problem is eliminated in practice by introducing a fixed azimuth angle of 10° separation between the beams so that there is a 10° azimuth separation from signals at zero altitude.

A circuit is disclosed herein for the determination of the azimuth angle separation $\Delta\phi$ by the use of an auxiliary cathode ray indicator combined with a conventional search radar system having a plan position indicator presenting echo signals from the vertical beam only. The auxiliary indicator shows on a modified "B" type presentation an expanded portion of the conventional radar search plan position indicator presentation, the azimuth angle being spotted vertically with range horizontally, as illustrated in Fig. 4. The lower portion of the cathode ray screen in this modified "B" presentation indicates echo signals received from the vertical beam, and the upper portion indicates echo signals from the slant beam. Two angle markers, one of which is in the lower portion, as at A of Fig. 4, and the other in the upper portion of the presentation, as at A' in Fig. 4, are vertically movable by adjustment to coincide with the vertical and slant beam radar target indications in their respective portions of the display. Adjusting dials are calibrated so that the azimuth angle of separation of the two radar target indications may be read directly upon proper alignment of the movable markers and the target echo pulses.

Figure 1:
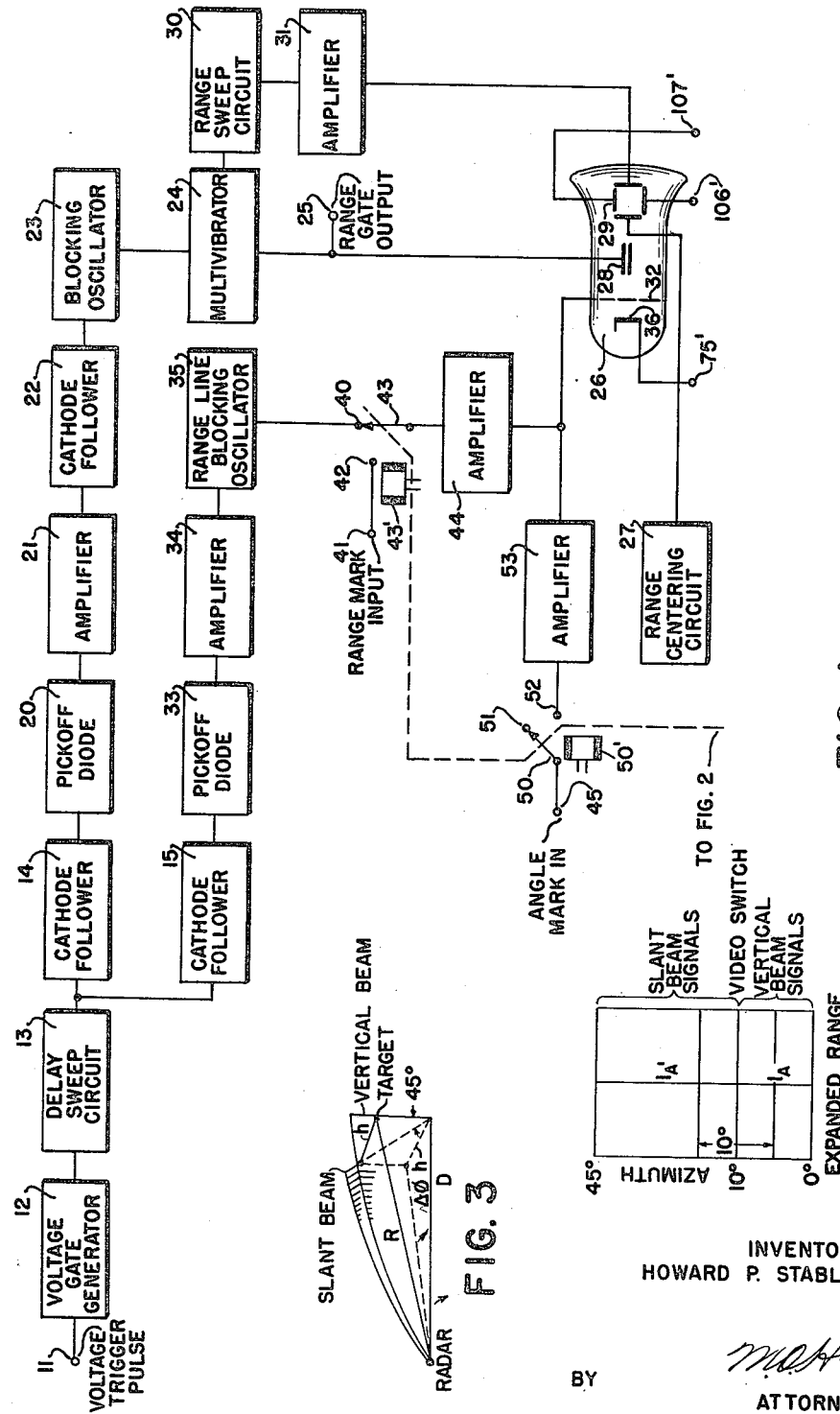
Fig. 1 is a portion of a schematic block diagram of one embodiment thereof.

Referring to the drawings and more particularly to Fig. 1, a voltage trigger pulse from the radar system transmitter is introduced at terminal 11. This voltage trigger pulse, which is in synchronism with the transmitter pulse, triggers voltage gate generator 12 producing a gate to enable delay sweep circuit 13. The sweep output from delay sweep circuit 13 is introduced jointly to cathode followers 14 and 15. The sweep voltage output from cathode follower 14 is introduced to pick-off diode 20; and the output from pick-off diode 20 is applied through amplifier 21 and cathode follower 22 to blocking oscillator 23. Multivibrator 24 is of the self-restoring "one-shot" type and when triggered by the voltage pulse output from blocking oscillator 23, produces a positive and a negative voltage range gate. The positive voltage gate output from multivibrator 24 is applied, as shown, to first anode 28 of cathode ray tube 26 and is also made available at terminal 25 for application to other parts of the circuit as hereinafter described. The negative voltage gate output from multivibrator 24 is used to enable range sweep circuit 30, the output of which is applied through amplifier 31 to one of the horizontal deflection plates at 29 of cathode ray tube 26. The other horizontal deflection plate at 29 of cathode ray tube 26 is connected to range centering circuit 27. Range centering circuit 27 consists of a voltage divider for changing the voltage applied to one of the horizontal deflection plates at 29 of cathode ray tube 26, applying an adjustable voltage to this deflection plate for horizontally centering the presentation on the screen of cathode ray tube 26.

The sweep voltage output from previously mentioned cathode follower 15 is coupled through pick-off diode 33 to amplifier 34. The output from amplifier 34 is used to trigger range line blocking oscillator 35 which produces a voltage pulse to be made available at relay contact 40. Range marks from the radar system are applied to input terminal 41 which is connected directly to relay contact 42. Relay contactor 43 which is associated with relay contacts 40 and 42 is connected to the input of amplifier 44. An angle mark generator (not shown) mechanically synchronized with the rotation of the radar antenna system provides a voltage output of such a nature that when applied to grid 32 of cathode ray tube 26 azimuth angle marks appear on the presentation on the screen of cathode ray tube 26. This voltage output from the angle mark generator applied at terminal 45 is connected through relay contactor 50 to either relay contact 51 or relay contact 52. Relay contact 51 is not connected, but relay contact 52 is connected to the input circuit of amplifier 53. The outputs from amplifier 44 and amplifier 53 are combined and coupled to grid 32 of cathode ray tube 26.

Figure 2:
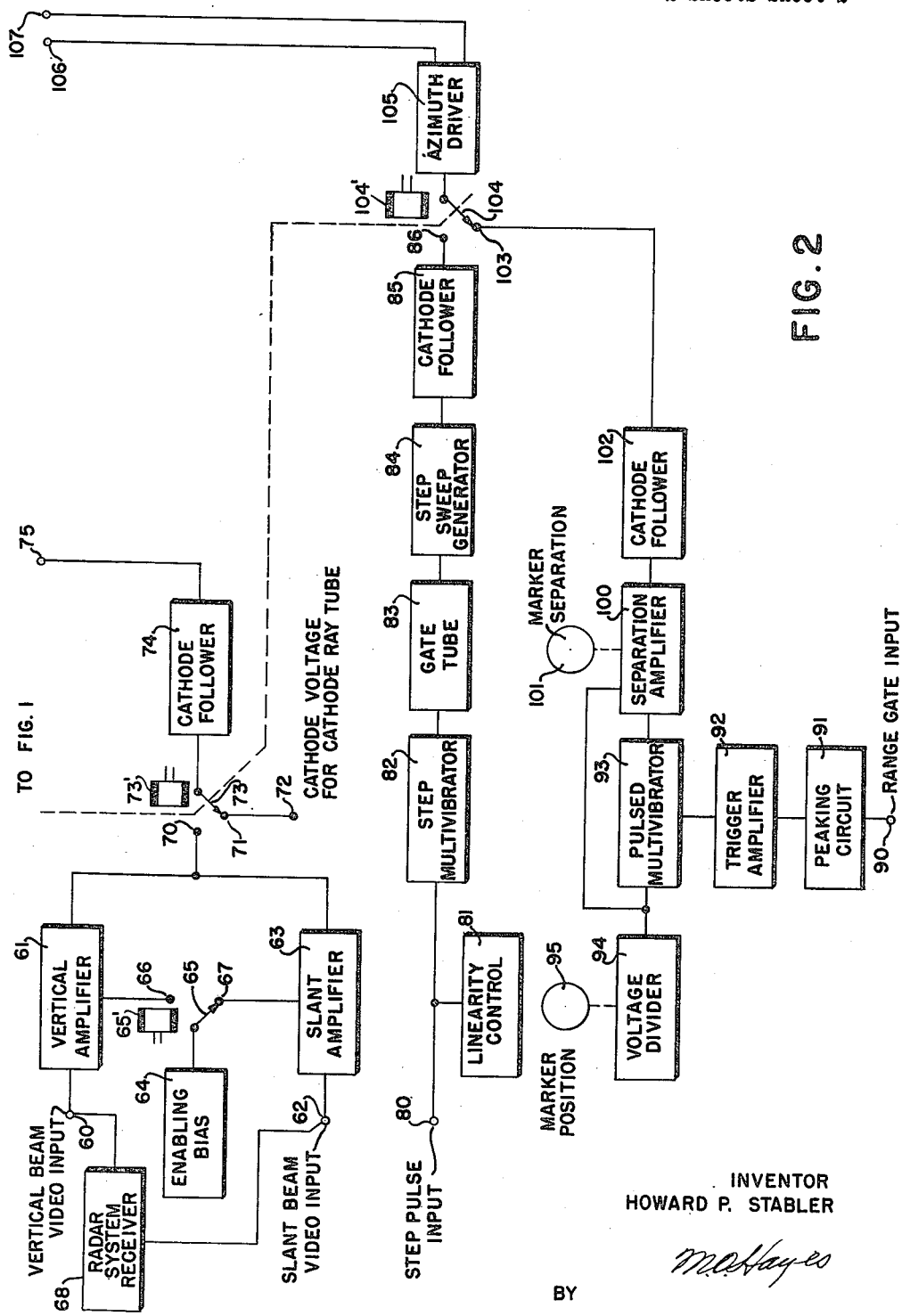
Fig. 2 is the remaining portion of this embodiment.

Referring to Fig. 2, the indicator video circuit comprises input terminals 60 and 62 connected to the vertical beam video and slant beam video circuits of the radar system receiver 68 to join these circuits with vertical amplifier 61, and slant amplifier 63 respectively. An enabling bias 64 connects directly to relay contactor 65 which may be switched to relay contact 66, connected to control vertical amplifier 61, or relay contact 67 connected to control slant amplifier 63. The output from amplifiers 61 and 63 are combined and connected to relay contact 70. The associated relay contact 71 connects directly to terminal 72 which is coupled to an operating voltage source for cathode 36 of cathode ray tube 26, and the associated relay contactor 73 is connected directly to cathode follower 74. If the input circuit to cathode follower 74 was continually connected to the common output circuit of vertical amplifier 61 and slant amplifier 63, the cathode operating voltage of cathode 36 of cathode ray tube 26 would be such that the range sweeps occurring in the interval between azimuth sweeps would be very bright and tend to obliterate the video presentations on the screen of cathode ray tube 26. Relay contactor 73, therefore, shifts the input circuit of cathode follower 74 to a cathode voltage available at terminal 72 that will diminish the intensity of the range sweeps when relay contactor 73 is in contact with relay contact 71. The output from cathode follower 74 is connected through terminal 75 (Fig. 2) or terminal 75' (Fig. 1) to cathode 36 of cathode ray tube 26 of Fig. 1.

A step pulse is applied at terminal 80 and together with the output from linearity control circuit 81 hereinafter described in detail is connected directly to the input of step multivibrator 82. The voltage gate output from step multivibrator 82 is applied to gate tube 83 and thence to step sweep generator 84. The output of step sweep generator 84 is connected through cathode follower 85 to relay contact 86. The positive range voltage gate available at terminal 25 of Fig. 1 is applied through terminal 90 to peaking circuit 91. The positive output from peaking circuit 91 is amplified by trigger amplifier 92 and applied as a trigger voltage pulse to pulsed multivibrator 93. Voltage divider 94 which is of the double potentiometer type may be adjusted by marker position knob 95 to vary the voltage at the arms but to maintain a constant voltage difference between the arms which is applied as a plate voltage supply to pulsed multivibrator 93. Separation amplifier 100 consists of two electron tubes which also have the aforementioned constant voltage difference as the plate voltage supply. These two electron tubes serving as amplifiers are controlled by the output from pulsed multivibrator 93 so that the individual electron tubes are alternately conducting and non-conducting and phased so that only a single tube is conducting at any time. The plate resistor for one of the electron tubes of separation amplifier 100 has a variable pick-off arm, mechanically adjustable by upper marker position knob 101, from which is obtained a square wave voltage output. During the period that the associated electron tube is non-conducting, the voltage output is at its maximum value which is determined by the setting of voltage divider 94; and during the period that the associated electron tube is conducting, the voltage output is at its minimum value. The voltage difference between the maximum and minimum values of the square wave voltage being determined by the setting of marker separation knob 101. The square wave voltage output from separation amplifier 100 connects through cathode follower 102 to relay contact 103. Relay contactor 104, connects the input circuit of azimuth driver 105 to either relay contact 103 or relay contact 86. Azimuth driver 105 is a push pull amplifier having its output applied to the vertical deflection plates at 29 of cathode ray tube 26 through terminals 106, 107, of Fig. 2 and 106', 107', of Fig. 1.

A more detailed description of the connections and operation of the azimuth marker circuit above described may be found in my Patent No. 2,567,742, issued September 11, 1951 (application filed September 24, 1946).

In the operation of this embodiment of the invention, a voltage trigger pulse from the associated radar system transmitter is introduced at terminal 11 in Fig. 1, and initiates delay sweep circuit 13 which provides a delay sweep voltage through cathode follower 14 to the input of pick-off diode 20. Pick-off diode 20 is adjusted to prevent the passage of the delay sweep voltage to amplifier 21 until the delay sweep voltage has obtained a desired level. When the sweep voltage is permitted to be applied to amplifier 21, blocking oscillator 23 is triggered thereby to produce a pulse voltage output, delayed from the time of the input trigger voltage according to the setting of pick-off diode 20. The delayed pulse output from blocking oscillator 23 triggers multivibrator 24 which produces a positive and a negative range voltage gate. The positive voltage range gate is applied to accelerating anode 28 of cathode ray tube 26 to provide the proper operating potential during the range sweep, and is further made available at terminal 25. The negative voltage range gate is applied to range sweep circuit 30 which provides a sweep voltage output during the length of the range gate. This output is amplified and applied to one of the horizontal deflection plates at 29 of cathode ray tube 26 to provide a range sweep at the transmitter pulse repetition rate. The range sweep thus provided may be delayed in time from the radar transmitter pulse by any desired amount as determined by the adjustment of pick-off diode 20 to provide an expanded range sweep over a desired radar range.

The output from delay sweep circuit 13 is also fed through cathode follower 15 to pick-off diode 33. Pick-off diode 33 and amplifier 34 provide a delayed trigger to actuate range line blocking oscillator 35 to produce a delayed range marker line that is generally controlled by adjustment of pick-off diode 33 to appear at a time corresponding to the range of the signal being observed by the radar system. The delayed range marker line is applied to relay contact 40 for application, through amplifier 44 to grid 32 of cathode ray tube 26 during the appropriate setting of relay contactor 43.

Relay contactor 43 also provides amplifier 44 with a connection to range mark input terminal 41 during an appropriate relay setting. The grid 32 of cathode ray tube 26 also receives angle marker signals from amplifier 53 when relay contactor 50, which is connected directly to angle mark input terminal 45, makes contact with relay contact 52.

Video signals from the vertical beam antennas and slant beam are applied from receiver 68 through terminals 60 and 62 to their respective amplifiers 61 and 63 which are enabled and disabled alternately according to the position of relay contactor 65. The outputs from amplifiers 61 and 63 are applied to relay contact 70. A cathode operating voltage for diminishing the intensity of the range sweep as hereinbefore explained is applied to relay contact 71 so that relay contactor 73 may couple to cathode 36 of cathode ray tube 26 through cathode follower 74 either the video signals or the cathode operating potential depending upon its position.

A step pulse generator (not shown) mechanically synchronized with the radar antenna produces a voltage pulse output for every thirtieth of a degree of rotation of the antenna system. This voltage pulse is applied as a step pulse input to terminal 80 and applied to step multivibrator 82. Step multivibrator 82 is a self-restoring multivibrator that produces a negative voltage gate output after each step pulse input. Linearity control 81 consisting of a condenser, charging resistor, and control potentiometer raises the voltage on the input of step multivibrator 82 to lengthen the voltage gate output from step multivibrator 82 during the sweep output from step sweep generator 84 to overcome non-linearity in step sweep generator 84. The voltage gate output from step multivibrator 82 is passed to gate tube 83 which is an isolating cathode follower stage. Step sweep generator 84 comprises an electron tube connected as a constant current device which passes current only during the presence of the voltage gate output from gate tube 83. The constant current during the voltage gate passes through a large condenser in step sweep generator 84 causing it to be charged in equal increments to produce a voltage changing linearly with the motion of the antenna systems. This linear voltage change is applied as a synchronized azimuth sweep through cathode follower 85 to relay contact 86.

A more detailed description of the connection and operation of the azimuth sweep generator above disclosed may be found in my co-pending application Ser. No. 699,045, filed September 24, 1946.

The range gate from multivibrator 24, available at terminal 25, is applied to terminal 90 and thence to peaking circuit 91. The output from peaking circuit 91 applied to trigger amplifier 92 produces a positive voltage trigger for pulsed multivibrator 93. Pulsed multivibrator 93 is of the flip-flop type having two quiescent operating conditions and requiring a trigger from trigger amplifier 92 to change it from either one of the quiescent conditions to the other. The operating voltage for pulsed multivibrator 93 is obtained from voltage divider 94 which is mechanically controlled by marker position knob 95. Voltage divider 94 is of the double potentiometer type with the voltage at the arms variable but maintaining the same difference of potential between the arms. The output from pulsed multivibrator 93 is applied to separation amplifier 100 so that a square wave voltage output is obtained from separation amplifier 100 with the upper and lower voltage values variable by marker position knob 95 and marker separation knob 101. As it requires two pulses to operate pulsed multivibrator 93 through a complete cycle, the frequency of the square wave voltage output is one half the pulse repetition rate of the radar transmitter so that a single range sweep occurs during each half cycle of the square wave voltage output. The output from separation amplifier 100 is applied through cathode follower 102 to relay contact 103. Relay contactor 104 couples either the azimuth step sweep voltage available at relay contact 86 or the square wave voltage available at terminal 103 through azimuth driver 105 to the vertical deflection plates at 29 of cathode ray tube 26.

Sequence switches (not shown), located so as to be controlled by the rotation of the deflection coils of the search radar system P. P. I. cathode ray indicator adjustable mechanically to select a desired target in azimuth by means of an azimuth indication on the P. P. I. presentation, control the energization of relay coils 43' and 50' of Fig. 1 and 65', 73' and 104' of Fig. 2. When the vertical beam of the radar system is at an azimuth angle of five degrees less than the azimuth angle of the particular radar target being considered, all relay contactors are switched by operation of the sequence switches from their unenergized positions, as shown in Fig. 1 and Fig. 2, to their energized positions. Under these conditions of relay operation the grid of cathode ray tube 26 is connected through relay contactor 43 of Fig. 1 to range mark input terminal 41 and to angle mark input terminal 45 through relay contactor 50 of Fig. 1; vertical amplifier 61, Fig. 2, is enabled due to the connection to enabling bias 64 by relay contactor 65 and the output from vertical amplifier 61 is coupled to cathode 36 of cathode ray tube 26 through relay contactor 73; and the azimuth step sweep voltage is coupled through relay contactor 104, Fig. 2, to the vertical deflection plates at 29 of cathode ray tube 26. This portion of the relaying cycle continues until the antenna has swept through ten degrees of azimuth angle at which time relay contactor 65, Fig. 2 is released and returns to the position of contact with relay contact 67, disabling vertical amplifier 61 and enabling slant amplifier 63. After the antenna has rotated fifty degrees of azimuth angle beyond the radar target, relay contactors 43 and 51, Fig. 1, and 73 and 104, Fig. 2 are returned to their unenergized position. Under these conditions of relay operation, grid 32 of cathode ray tube 26 receives a delayed range mark line from range line blocking oscillator 35 through relay contactor 43, cathode 36 of cathode ray tube 26 is connected to an operating voltage supply through relay contactor 73; and an adjustable square wave voltage is applied through relay contactor 104 to the vertical deflection plates at 29 of cathode ray tube 26.

The operation of the relays may be more clearly understood by referring to the following tabulation in which the relay operation is tabulated as a function of antenna rotation with the critical referece azimuth angle selected as the angle at which the vertical fan beam is at an azimuth angle of five degrees less than the azimuth angle of the radar target.

| Degrees of Rotation of Antenna System beyond Azimuth Reference Angle | Relay No. | Operation |
| --- | --- | --- |
| 0 | 43 | Applies range mark voltages through amplifier 44 to grid 32 of cathode ray tube 26. |
|  | 50 | Applies angle mark voltages through amplifier 53 to grid 32 of cathode ray tube 26. |
|  | 65 | Applies enabling bias to vertical amplifier 61. |
|  | 73 | Applies video signal voltages through cathode follower 74 to cathode 36 of cathode ray tube 26. |
|  | 104 | Applies azimuth sweep voltage through azimuth driver to vertical deflection plates at 29 of cathode ray tube 26. |
| 5 |  | Vertical Beam passes through azimuth angle of selected radar target. |
| 10 | 65 | Removes enabling bias from vertical amplifier 61 and applies it to slant amplifier 63. |
| 5 | 43 | Removes range mark voltages and applies range line voltage through amplifier 44 to grid 32 of cathode ray tube 26. |
|  | 50 | Removes angle mark voltages from input circuit of amplifier 33. |
|  | 73 | Removes video signals and applies cathode operating voltage through cathode follower 74 to cathode 36 of cathode ray tube 26. |
|  | 104 | Removes azimuth sweep voltage and applies azimuth marker voltages through azimuth driver 105 to vertical deflection plates at 29 of cathode ray tube 26. |

The above described relay action results in a presentation on cathode ray tube 26, as shown in Fig. 4, having azimuth angle plotted vertically and range, horizontally. The lower ten degrees of azimuth angle presents video signals from the vertical beam and the upper forty five degrees presents video signals from the slant beam. Appropriate angle marks and range marks appear on the presentation concurrently with the slant and vertical video signals. In the periods between azimuth sweeps two adjustable azimuth markers appear on the presentation due to the square wave voltage applied to the vertical deflection plates at 29 of cathode ray tube 26. Due to the persistence of the cathode ray tube screen the azimuth markers may be aligned with the video signal from the vertical and slant beam to provide a means for measuring the angle of rotation between the occurrence of the two video signals.

If, for example, in Fig. 4, the selected azimuth is 120° and the selected range is 53 miles, the adjustment gives the lowest azimuth marker at 115°, the target echo pulse from the vertical beam is displayed at "A," 5° from the bottom of the presentation, and the selected range interval will be from 48 to 58 miles with the target in the center of the range sweep. At an azimuth equivalent to 125°, the circuit operates to disconnect signal pulses derived from the vertical beam antenna and applies signal pulses derived from the slant beam antenna. Target echo pulses from the slant beam appear on substantially the same range line at "A'." Marker pulses are adjusted to appear superimposed over the target echo pulses at "A" and "A'," respectively, to provide an indication of the azimuth angular separation $\Delta\phi$, the calibration being such as to include the fixed 10° angular separation for zero altitude.

The invention described in the foregoing specification need not be limited to the details shown, which are considered to be illustrative of one form the invention may take.

What is claimed is:

1. An auxiliary indicator system for azimuth angle determination in a radar system for determining target height by the utilization of a vertical and slant beam comprising, a cathode ray tube, a source of voltage trigger pulses, means operated by said voltage trigger pulses to generate delayed voltage pulses, means to vary the delay between said voltage trigger pulses and said delayed voltage pulses, a range sweep circuit triggered by said delayed voltage pulses, the output from said range sweep circuit being applied to one of the horizontal deflection plates of said cathode ray tube to produce an expanded range sweep adjustable over the range of said radar system, centering means connected to the other horizontal deflection plate of said cathode ray tube, means to produce an azimuth sweep voltage synchronized with the motion of the antenna of said radar system, means to produce a voltage square wave adjustable in average value and peak to peak value, first switching means to apply either said azimuth sweep voltage or said square wave voltage to the vertical deflection plates of said cathode ray tube, said square wave voltage when applied to said vertical deflection plates of said cathode ray tube producing two azimuth markers, said markers serving to measure azimuth angle between video signals appearing on the presentation of said cathode ray tube, a source of video signals from the vertical beam of said radar system, a source of video signals from the slant beam of said radar system, and second switching means to apply to the cathode of said cathode ray tube video signals from either of said sources.

2. An auxiliary indicator system for azimuth angle determination in a radar system for determining height of a radar target by utilization of a vertical and slant beam comprising, a cathode ray tube, a source of voltage trigger pulses, means operated by said voltage trigger pulses to produce a delayed range sweep voltage, said delayed range sweep voltage producing, when applied to the horizontal deflection plates of said cathode ray tube, an expanded range sweep variable over the range of said radar system, a source of step pulse voltages, said step pulse voltages occurring at a frequency dependent upon the speed of operation of the antenna of said radar system, a second sweep voltage generator responsive to said step pulse voltages to produce an azimuth sweep voltage output synchronized with the rotation of said antenna of said radar system, means to produce a square voltage waveform adjustable in average and peak to peak voltage values, first switching means to apply either said azimuth sweep voltage or said square voltage waveform to the vertical deflection plates of said cathode ray tube, said azimuth sweep voltage producing an azimuth sweep of said cathode ray and said square voltage waveform producing two azimuth markers adjustable in azimuth angle on the screen of said cathode ray tube, a source of video signal voltages from said vertical beam of said radar system, a source of video signal voltages from said slant beam, second and third switching means applying on the cathode of said cathode ray tube video signals from said vertical beam source during a selected lower portion of said azimuth sweep and video signals from said slant beam source during the remaining upper portion of said azimuth sweep respectively, a source of range marks, a source of azimuth angle marks, and fourth and fifth switching means to couple range marks from said source of range marks and angle marks from said source of azimuth angle marks to the grid of said cathode ray tube for presentation on the screen of said cathode ray tube.

3. An auxiliary indicator system for azimuth angle determination of a radar system utilizing a vertical beam and a slant beam for target height determination comprising, a cathode ray tube, means for producing a range voltage gate variable in time over the range of said radar system, means for generating an expanded range sweep upon application of said range voltage gate, a peaking circuit, a trigger amplifier, said peaking circuit and said trigger amplifier connected to produce a positive trigger voltage upon the application of said range voltage gate to said peaking circuit, a pulsed multivibrator having two stable operating conditions, said pulse multivibrator being triggered alternately from one of said stable conditions to the other upon successive application of said positive trigger voltages, a separation amplifier adapted to be operated by the output from said pulsed multivibrator to produce a square wave voltage output, a voltage divider connected to said pulsed multivibrator and said separation amplifier to adjust the average value of said square wave voltage output from said pulsed multivibrator, calibrated means on said separation amplifier to vary the peak to peak voltage value of said square wave voltage output, means for generating an azimuth sweep voltage synchronized with the operation of the antenna of said radar system, first switching means to alternately couple said azimuth sweep voltage and said square wave voltage to the vertical deflection plates of said cathode ray tube, said square wave voltage producing on the presentation of said cathode ray tube two azimuth markers separable in azimuth angle by said calibrated means on said separation amplifier and serving to measure azimuth angle between two points of said presentation, a source of range marks, a source of angle marks, second switching means to apply said range marks to the grid of said cathode ray tube, and third switching means to apply said angle marks to the grid of said cathode ray tube, a source of video signal voltages from said vertical beam, a source of video signal voltages from said slant beam, and fourth and fifth switching means to couple said video signals from said vertical beam to the cathode of said cathode ray tube during the lower portion of said azimuth sweep and said video signals from said slant beam, during the upper portion of said azimuth sweep.

4. In a radio pulse echo radar search system having an azimuth scanning directional antenna radiating pulsed microwave energy in a vertical beam and a slant beam, an auxiliary indicator for target height determination comprising, a cathode ray indicator, a sweep voltage generator for producing an expanded range sweep deflection voltage, said range sweep voltage being continuously adjustable in time of occurrence over the range of said radar system, a second sweep voltage generator means for synchronizing the output of said second sweep voltage generator with the antenna scanning motion of said radar system, a square wave generator, a first switch for applying vertical beam signal echo pulses to intensify said cathode ray from said radar system during a first predetermined portion of the scanning motion of said antenna selected in accordance with the azimuth bearing of a desired target and for applying slant beam signal echo pulses to intensify said cathode ray from said radar system during a successive second predetermined portion of the scanning motion of said antenna, a second switch for applying said range sweep deflection voltage and said azimuth sweep voltage to deflect said cathode ray during said first and second predetermined portions of said antenna scanning motion, said second switch applying said square wave voltage to deflect said cathode ray as azimuth marked pulses during the remainder of said antenna scanning motion, and calibrated adjustable resistance means for adjusting the average and peak voltage values of said square wave, in order that the adjustment of said square voltage wave in average and peak values to superimpose said target echo signal pulses and said azimuth marker pulses on the screen of said cathode ray indicator provides a reading of azimuth angular separation of said vertical beam and said slant beam at the range of said target.

5. In a radio pulse echo radar search system having an azimuth scanning directional antenna radiating pulsed microwave energy vertical beam and a slant beam, an auxiliary indicator for target height determination comprising, a cathode ray indicator, a sweep generator for producing an expanded range sweep deflection voltage, a second sweep voltage generator for producing a range line voltage pulse, said range sweep voltage and said range line voltage pulse being continuously adjustable in time of occurrence over the range of said radar system, a third sweep voltage generator for producing an azimuth sweep voltage synchronized with the antenna scanning motion of said radar system, means for producing a square wave voltage, a first switch for applying vertical beam signal echo pulses to intensify said cathode ray from said radar system during a first predetermined portion of the scanning motion of said antenna selected in accordance with the azimuth bearing of a desired target and for applying slant beam signal echo pulses to intensify said cathode ray from said radar system during a successive second predetermined portion of the scanning motion of said antenna, a second switch for applying said range sweep deflection voltage and said azimuth sweep voltage to deflect said cathode ray during said first and second predetermined portions of said antenna scanning motion, said second switch applying said square wave voltage to said cathode ray tube as azimuth marker pulses during the remainder of said antenna scanning motion, and calibrated adjustable resistance means for adjusting the average and peak voltage values of said square wave, in order that the adjustment of said square voltage wave in average and peak values to superimpose said target echo signal pulses and said azimuth marker pulses on the screen of said indicator provides a reading of azimuth angular separation of said vertical beam and said slant beam at the range of said target.

6. An auxiliary indicator system for azimuth angle determination in a radar system for determining target height by the utilization of a vertical beam and a slant beam of microwave energy comprising, a cathode ray tube, a source of voltage trigger pulses synchronized with the transmission of energy by said radar system, a sweep voltage generator responsive to pulses from said source to generate an expanded range sweep adjustable in time of occurrence over the range of said radar system, means to produce an azimuth sweep voltage synchronized with the motion of the antenna of said radar system, means to produce a voltage square wave adjustable in average value and peak to peak value, first switching means to apply either said azimuth sweep voltage or said square wave voltage to the vertical deflection plates of said cathode ray tube, said square wave voltage when applied to said vertical deflection plates of said cathode ray tube producing two azimuth markers, said markers serving to measure azimuth angle between video signals appearing on the presentation of said cathode ray tube, a source of video signals from the vertical beam of said radar system, a source of video signals from the slant beam of said radar system, and second switching means to apply said expanded range sweep voltage to the horizontal deflection plates of said cathode ray tube while applying to the cathode of said cathode ray tube video signals from either of said sources.

7. Apparatus as in claim 1 comprising additional means to adjust the time of occurrence of said range sweep and said azimuth sweep deflection voltages in accordance with the bearing in azimuth and range of a selected target.

8. Apparatus as in claim 2 comprising additional means to adjust the time of occurrence of said range sweep and said azimuth sweep deflection voltages in accordance with the bearing in azimuth and range of a selected target.

9. Apparatus as in claim 3 comprising additional means to adjust the time of occurrence of said range sweep and said azimuth sweep deflection voltages in accordance with the bearing in azimuth and range of a selected target.

10. In a radio pulse echo radar search system having an azimuth scanning directional antenna radiating pulsed microwave energy in a vertical beam and in a slant beam, an auxiliary indicator for target height determination comprising, a cathode ray indicator, means for producing a range sweep voltage at the pulse repetition frequency of said radar system, means for producing an azimuth sweep voltage in synchronism with the scanning motion of said antenna, a square wave generator having an output adjustable in average value and peak-to-peak value of voltage, means for intensifying said cathode ray in response to pulse echo signals from said radar system for a predetermined on-target portion of the scanning motion of said antenna selected in accordance with the azimuth bearing of a desired target, means for applying said range sweep voltage and said azimuth sweep voltage to deflect said cathode ray during said predetermined on-target portion of said antenna scanning motion, and means for applying said square wave voltage output of said square wave generator to deflect said cathode ray during the off-target portion of said antenna scanning motion, whereby adjustment of the average value and peak-to-peak value of said square wave to superimpose the display of said square wave on pulse echo signals from said radar system provides an indication of the height of said target.

11. In a radio pulse echo radar search and height finding system having an azimuth scanning directional antenna radiating pulsed microwave energy in a vertical beam and in a slant beam and a cathode ray indicator displaying vertical beam pulse echo signals and slant beam pulse echo signals during successive predetermined on-target portions of the scanning motion of said antenna selected in accordance with the azimuth bearing of a desired target, azimuth angle determining apparatus comprising, a source of voltage trigger pulses synchronized with the transmission of microwave energy pulses by said radar system, a square wave voltage generator responsive to trigger pulses from said source to produce an output voltage synchronized to the pulse repetition frequency of said radar system, switching means operative during the off-target portions of the scanning motion of said antenna for applying the output of said square wave generator as a deflection voltage to said indicator to display thereon marker pulses, and means for adjusting the peak-to-peak and the average voltage values of said square wave to superimpose the display of said marker pulses on the display of said pulse echo signals.

12. In a radio pulse echo radar search and height finding system having an azimuth scanning directional antenna radiating pulsed microwave energy in a vertical beam and in a slant beam and a cathode ray indicator displaying vertical beam pulse echo signals and slant beam pulse echo signals during successive predetermined on-target portions of the scanning motion of said antenna selected in accordance with the azimuth bearing of a desired target, azimuth angle determining apparatus comprising a source of voltage trigger pulses synchronized with the transmission of microwave energy pulses by said radar system, a triggered multivibrator responsive to trigger pulses from said source to produce an output voltage having rectangular wave form, means for adjusting the peak-to-peak and average voltage values of said multivibrator output voltage, and switching means operating during the off-target portion of the scanning motion of said antenna for applying the output of said multivibrator as a deflection voltage to said indicator to display thereon marker pulses, whereby adjustment of average and peak voltage values of said square wave to superimpose said marker pulses on said pulse echo signals indicates azimuth angular separation of said vertical beam and said slant beam at the range of said target.

HOWARD P. STABLER.

References Cited in the file of this patent

UNITED STATES PATENTS

| Number | Name | Date |
|---|---|---|
| 2,415,095 | Varian et al. | Feb. 4, 1947 |
| 2,422,697 | Meacham | June 24, 1947 |
| 2,424,984 | Hoffman | Aug. 5, 1947 |
| 2,426,189 | Espenschied | Aug. 26, 1947 |
| 2,538,800 | Ranger | Jan. 23, 1951 |

OTHER REFERENCES

"The MPG-1 Radar" by Straus et al.; Electronics, March 1946, pages 140 to 147; copy in Div. 51.